United States Patent [19]
Campbell

[11] Patent Number: 5,975,609
[45] Date of Patent: *Nov. 2, 1999

[54] SOUND INSULATING LAYER WITH INTEGRAL BOOT

[75] Inventor: Michael T. Campbell, Grand Rapids, Mich.

[73] Assignee: Cascade Engineering, Inc., Grand Rapids, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/897,996

[22] Filed: Jul. 25, 1997

Related U.S. Application Data

[60] Provisional application No. 60/022,669, Jul. 26, 1996.

[51] Int. Cl.[6] ................................................ B62D 33/00
[52] U.S. Cl. .................................... 296/39.3; 181/284
[58] Field of Search ........................... 296/39.3; 181/284, 181/290, 293

[56] References Cited

U.S. PATENT DOCUMENTS

| | | |
|---|---|---|
| Re. 33,701 | 9/1991 | Triquet . |
| 1,945,717 | 2/1934 | Woodall ............................. 296/39.3 X |
| 2,250,510 | 7/1941 | Van Buren . |
| 2,843,419 | 7/1958 | Wilfert . |
| 3,897,849 | 8/1975 | Mossner et al. . |
| 4,083,595 | 4/1978 | Maier ..................................... 296/39.3 |
| 4,086,825 | 5/1978 | Badcock et al. . |
| 4,664,390 | 5/1987 | Houseman . |
| 4,840,386 | 6/1989 | Peitsmeier et al. . |
| 4,991,457 | 2/1991 | Chen . |
| 5,005,898 | 4/1991 | Benedetto et al. . |
| 5,243,153 | 9/1993 | Holwerda . |
| 5,557,078 | 9/1996 | Holwerda . |

FOREIGN PATENT DOCUMENTS

| | | |
|---|---|---|
| 0 329 526 | 8/1989 | European Pat. Off. . |
| 2 674 200 | 9/1992 | France . |
| 1-271444 | 10/1989 | Japan . |
| 2 252 596 | 8/1992 | United Kingdom . |

*Primary Examiner*—Joseph D. Pape
*Attorney, Agent, or Firm*—Rader, Fishman, Grauer & Mc Garry

[57] ABSTRACT

An acoustical barrier (10) for mounting to the fire wall (20) of a motor vehicle includes a sound barrier layer (12) of a molded construction and sound dampening characteristics. The sound barrier layer (12) has an integrally molded boot (40) for receiving and acoustically sealing a steering column (70). The boot (40) has a base portion (42) integrally molded with a convolute portion (48), and a cap portion (56) integrally molded with the convolute portion (48). The convolute portion (48) includes a continuous outer wall section (50) surrounding an opening (46) in the sound barrier layer (12). The continuous outer wall section (50) has an upper end integrally formed with a flexible bight portion (54). A continuous inner wall (52) has an upper end integrally formed with the bight portion (54) and a lower end integrally formed with the cap portion (56). The cap portion (56) has an opening coincident with the openings (46, 78) in the sound barrier layer (12) and fire wall (20), respectively. The thickness of the convolute portion (48) is less than the thickness of the base portion (42), cap portion (56) and sound barrier layer (12) to prevent distortion of the sound barrier layer (12) during installation of the steering column (70). An absorber layer (14) can be mounted between the sound barrier layer (12) and fire wall (20).

20 Claims, 2 Drawing Sheets

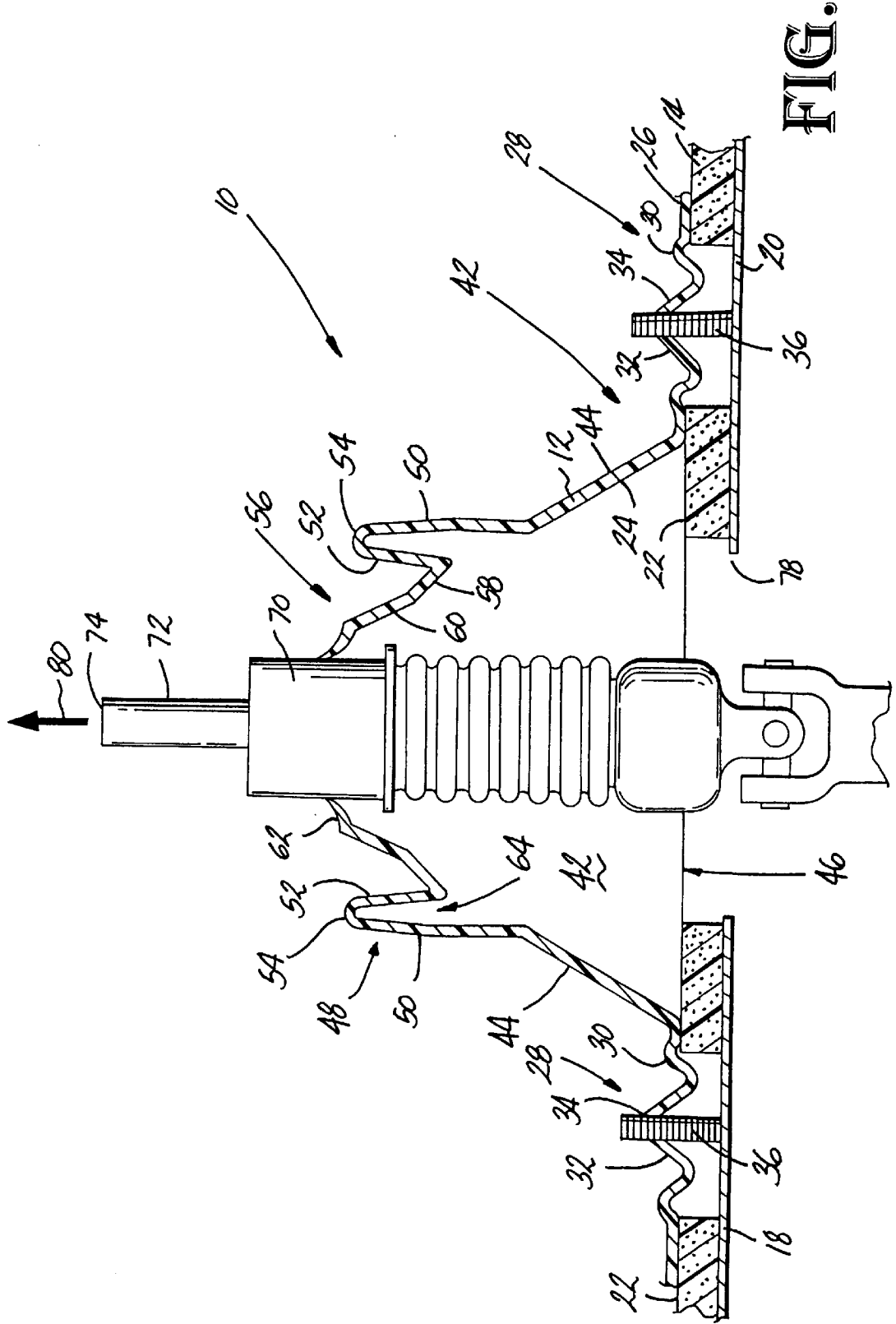

SOUND INSULATING LAYER WITH INTEGRAL BOOT

CROSS-REFERENCE TO RELATED APPLICATION

This application claims the benefit of U.S. Provisional Application No. 60/022,669 filed on Jul. 26, 1996.

BACKGROUND OF THE INVENTION

1. Field of the Invention

This invention relates to a sound insulating layer for a vehicle, and more particularly to a sound barrier mat having an integrally formed steering column boot.

2. Description of the Related Art

In most contemporary automobiles, a steel fire wall separates the engine compartment from the passenger compartment. To reduce the transmission of sound from the engine compartment through the fire wall and into the passenger compartment, a sound barrier mat (otherwise known as a dash mat) is typically molded of an elastomeric material. The dash mat is mounted to and substantially overlies the fire wall such that an outer surface of the mat is in contact with a bottom surface of the vehicle carpet and extends beyond the carpet to an upper portion of the fire wall behind the instrument panel. An absorber layer, typically constructed of an open cell foam material, can be attached to the dash mat to interface between the sound barrier mat and the fire wall.

During installation of the dash mat, an opening for the vehicle steering column in the dash mat is aligned with a corresponding opening in the fire wall. Other formations in the dash mat are also aligned with various other features on or protruding from the fire wall. The dash mat is then secured to the fire wall on the passenger compartment side. A steering column is subsequently inserted through the aligned openings in the fire wall and dash mat. A flexible boot is installed snugly around the steering column and then attached to the fire wall or dash mat with fasteners. Installation of the boot and dash mat in this manner requires a plurality of different parts and fasteners. The plurality of parts and fasteners results in increased inventory, expense, and installation time. Moreover, the seam between the boot and dash mat or fire wall is subject to leakage. Noise, air, water, etc. may undesirably transfer from the engine compartment to the passenger compartment through the seam.

SUMMARY OF THE INVENTION

According to the invention, an acoustical barrier for mounting to a barrier wall has a sound barrier layer of a molded construction and sound dampening characteristics. The sound barrier layer includes an inner surface that is adapted to face the barrier wall and an outer surface adapted to face away from the barrier wall. An opening extends through the sound barrier layer between the inner and outer surfaces. A boot is integrally molded with the sound barrier layer and includes a convolute portion and a cap portion integrally molded therewith. The convolute portion comprises a continuous outer wall section surrounding the opening. The continuous outer wall section has an upper end integrally formed with a flexible bight portion, a continuous inner wall having an upper end integrally formed with the bight portion and a lower end integrally formed with the cap portion. The cap portion has an opening coincident with the opening in the sound barrier layer. Preferably, the boot also comprises a base having a continuous lower wall section integrally formed between the sound barrier layer and a lower end of the continuous outer wall section. The continuous lower wall section preferably projects upwardly and inwardly from the outer surface of the sound barrier layer toward a central axis of the sound barrier layer opening.

According to a further embodiment of the invention, an acoustical barrier is mounted to the fire wall of a motor vehicle. The fire wall separates an engine compartment from a passenger compartment and has an opening that receives a steering column assembly. The acoustical barrier comprises a sound barrier layer of a molded construction and sound dampening characteristics. The sound barrier layer has an inner surface that faces the fire wall and an outer surface that faces away from the fire wall. An opening extends through the sound barrier layer between the inner and outer surfaces thereof and is in alignment with the opening in the fire wall for receiving the steering column. A boot is integrally molded with the sound barrier layer. The boot has a convolute portion and a cap portion integrally molded with the convolute portion. The convolute portion includes a continuous outer wall section surrounding the opening in the sound barrier layer. The continuous outer wall section has an upper end integrally formed with a flexible bight portion, a continuous inner wall having an upper end integrally formed with the bight portion and a lower end integrally formed with the cap portion. The cap portion has an opening in alignment with the openings in the sound barrier layer and fire wall.

The continuous inner wall extends in the same general direction as the outer wall section to form an inner channel therebetween that faces the barrier wall. The width of the inner channel is preferably less than a cross dimension of the steering column shaft to thereby prevent entry of the shaft into the inner channel and thus damage to the boot during installation of the steering column.

Preferably, the thickness of the convolute portion is less than the thickness of the sound barrier layer to prevent distortion of the sound barrier layer during installation of the steering column. The thickness of the cap portion and base can also be greater than the thickness of the convolute portion.

BRIEF DESCRIPTION OF THE DRAWINGS

The invention will now be described with reference to the drawings in which:

FIG. 2 is a cross sectional view of the steering column boot and dash mat installed to a vehicle fire wall and steering column.

DETAILED DESCRIPTION OF THE PREFERRED EMBODIMENTS

Figure 1:
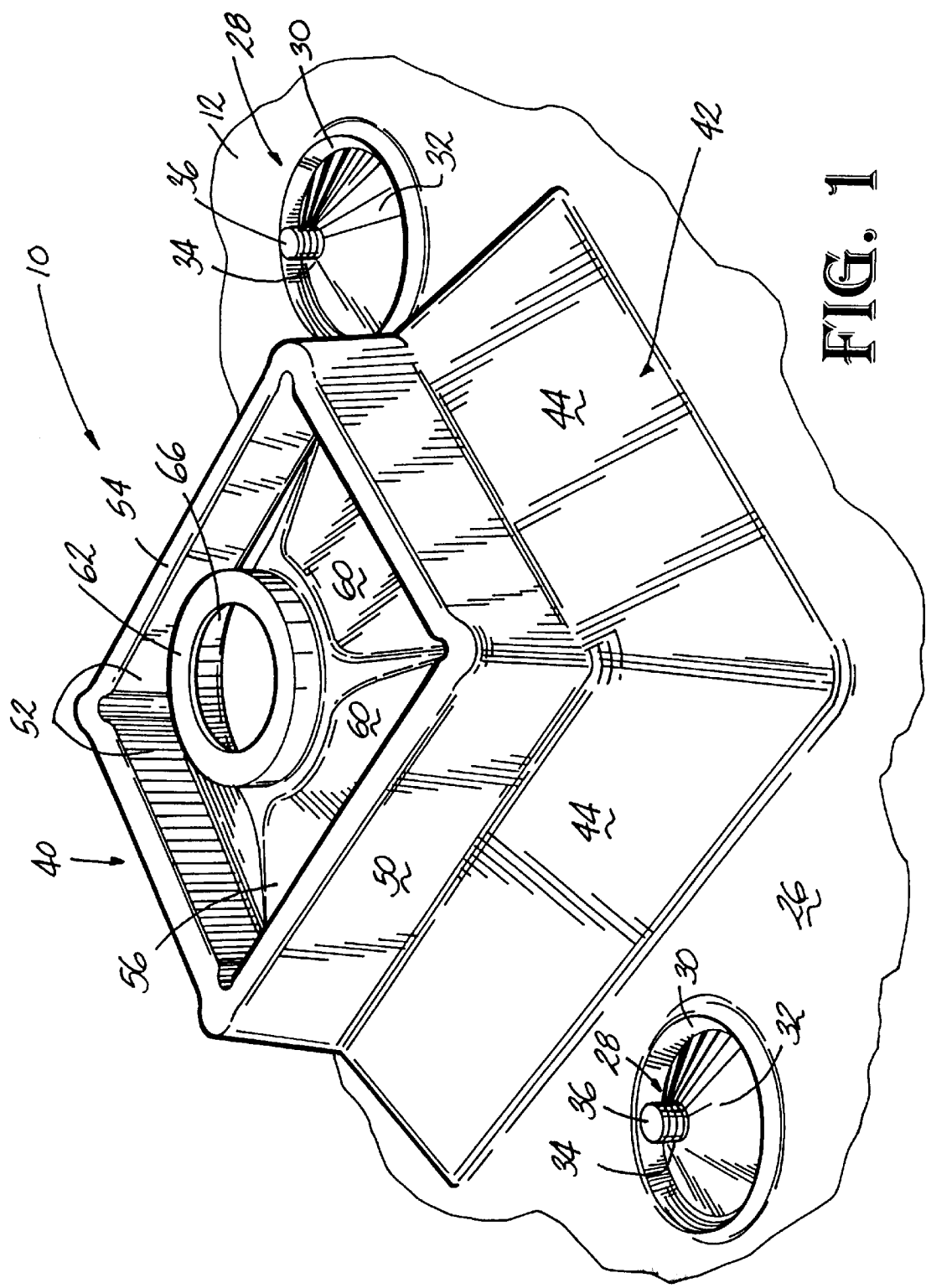
FIG. 1 is an outer perspective view of a steering column boot integrally formed with a vehicle dash mat according to the invention.

Referring now to FIGS. 1 and 2, a dash mat assembly 10 includes an outer sound barrier layer or dash mat 12 and an inner absorber mat or layer 14. The sound barrier layer 12 is preferably formed of a filled elastomeric moldable polymer, e.g., elastomeric polypropylene, and is attached to a fire wall 20 of a vehicle from the passenger compartment side. The mat 12 serves as a sound barrier layer to reduce the transmission of sound from the engine compartment through the fire wall and into the passenger compartment of a vehicle. The inner absorber mat 14 is formed of a flexible foam material, such as polyurethane, or fiberglass batting. An inner surface 18 of the mat 14 is typically positioned against a vehicle fire wall 20, while an outer surface 22 thereof faces an inner surface 24 of the mat 12. An outer surface 26 of the mat 12 faces the underside of a vehicle carpet (not shown) and typically extends past the carpet behind the instrument panel.

A plurality of fasteners 28 are formed integrally with the dash mat 12 for securing the dash mat to the fire wall 20. Each fastener 28 comprises a cup-shaped depression 30 that extends downwardly from the outer surface 26 of the dash mat 12. A conical projection 32 extends upwardly from the cup-shaped depression 30 and has an opening 34 that extends through a central portion thereof.

A stud 36 is associated with each fastener 28 and projects outwardly from the fire wall 20. The stud 36 is received within the opening 34 in a friction fit when the dash mat is in the installed position. Further details of this mounting arrangement can be found in U.S. application Ser. No. 08/405,732, the disclosure of which is hereby incorporated by reference. Although the above-described mounting arrangement is preferred, other mounting arrangements can be used.

A steering column boot 40 is integrally formed in one piece with the dash mat 12 and protrudes outwardly from the outer surface 26. A base 42 of the boot 40 includes a lower peripheral wall 44 that extends around the perimeter of a steering column opening 46 in the dash mat 12. As illustrated, the lower peripheral wall 44 comprises four wall sections that project upwardly from the surface 26 and at an angle with respect thereto. The wall sections are continuous with each other and with the dash mat 12. A convolute 48 has an outer peripheral wall 50 attached to an inner peripheral wall 52 through a continuous bight portion 54. The outer peripheral wall 50 is molded between the lower peripheral wall 44 of the base 42 and the bight portion 54, while the inner peripheral wall 52 is molded between a cap 56 and the bight portion. The space between the outer and inner peripheral walls forms a continuous groove 64. The cap 56 comprises a lower peripheral cap segment 58 formed between the inner peripheral wall 52 of the convolute 48 and an upper peripheral cap segment 60. An annular collar 62 is formed at the outer end of the segment 60 and has a central opening 66 that is adapted to snugly engage a steering column 70. The lower segment 58 extends at a smaller angle with respect to a plane defined by the intersection of the upper surface 26 and the lower wall 44 than the upper segment 60. The width of the groove 64 in the convolute is preferably narrower than the top 74 of a steering column shaft 72 that extends outwardly from the steering column 70. Although the boot with its accompanying peripheral walls and segments are illustrated as being square-shaped, it is to be understood that circular, triangular, or other shapes can be formed with similar results.

During installation, the dash mat assembly 10 is placed in proximity to the fire wall 20 and the openings 34 in the fasteners 28 are aligned with the studs 36 protruding from the fire wall 20. Simultaneously, the opening 46 in the boot 40 is aligned with an opening 78 in the fire wall 20. The absorber layer 14 is preferably attached to the dash mat 12 before installation in the vehicle. The fasteners 28 are then pushed over the studs 36 to secure the dash mat 12 to the fire wall 20. Subsequently, the steering column 70 with its accompanying shaft 72 is inserted through the openings 78, 46 in the fire wall and dash mat, respectively, in a direction as represented by arrow 80, from the engine compartment. Ideally, the longitudinal axis of the steering column shaft 72 should be positioned perpendicular to the fire wall 20 and aligned with the central opening 66 of the collar 62 and then advanced toward the passenger compartment until it is completely installed. However, the shaft 72 may not be positioned perpendicular to the fire wall and may not be aligned with the central opening 66 during assembly. In this instance, the top 74 of the shaft 72 may engage an inner surface of the boot 40. Since the width of the inner groove 64 in the convolute 48 is preferably narrower than the top 74 of the shaft 72, the shaft cannot be inserted into the inner groove 64 as it is pushed toward the passenger compartment and therefore will not damage the boot. In addition, since the lower segment 58 of the cap extends at a smaller angle than the upper segment 60, the shaft will not bind at the inner opening. The orientation of the lower and upper segments 58, 60 guides the shaft 72 toward the collar central opening 66. The thickness of the cap 56 and the base 42 is greater than the thickness of the convolute 48 to enable the boot to flex when shaft is installed without deforming or damaging the dash mat 12.

When installed, the integrally formed boot of the present invention eliminates the seam and consequent seam leakage associated with the separately installed boot of the prior art, and eliminates the need for separate boot fasteners.

Although the invention finds particular use in automobile dash mats, it is to be understood that the invention also finds use in other automotive or non-automotive applications wherein a panel or layer of material having an integrally formed boot is to be attached to a support surface. For example, a mat having an integrally formed boot may be installed around a gear shift lever on the floor of a vehicle.

Reasonable variation and modification are possible within the spirit of the foregoing specification and drawings without departing from the scope of the invention.

The embodiments for which an exclusive property or privilege is claimed are defined as follows:

1. An acoustical barrier adapted to be mounted to a barrier wall, the acoustical barrier comprising:
   a sound barrier layer of a molded construction and sound dampening characteristics, the sound barrier layer having an inner surface that is adapted to face the barrier wall and an outer surface adapted to face away from the barrier wall, an opening extending through the sound barrier layer between the inner and outer surfaces;
   a boot integrally molded with the sound barrier layer, the boot having a convolute portion and a cap portion integrally molded therewith, the convolute portion comprising a continuous outer wall section surrounding the opening, the continuous outer wall section having an upper end integrally formed with a flexible bight portion, a continuous inner wall having an upper end integrally formed with the bight portion and a lower end integrally formed with the cap portion, the cap portion having an opening in alignment with the opening in the sound barrier layer.

2. An acoustical barrier according to claim 1 wherein the boot further comprises a base having a continuous lower wall section integrally formed between the sound barrier layer and a lower end of the continuous outer wall section, the continuous lower wall section surrounding the sound barrier layer opening and projecting upwardly and inwardly from the outer surface of the sound barrier layer toward a central axis of the sound barrier layer opening.

3. An acoustical barrier according to claim 2 wherein the continuous inner wall extends in the same general direction as the outer wall section to form an inner channel between the inner and outer wall sections that is adapted to face the barrier wall when the acoustical barrier is mounted thereto.

4. An acoustical barrier according to claim 3 wherein the cap portion comprises a lower cap segment integrally formed with the lower end of the inner wall, and an upper cap segment extending between the lower cap segment and the cap portion opening.

5. An acoustical barrier according to claim 4 wherein each of the upper and lower cap segments extends at an acute angle with respect to the central axis of the cap portion opening, the angle of the lower cap segment being greater than the angle of the upper cap segment.

6. An acoustical barrier according to claim 5 wherein the thickness of the convolute portion is less than the thickness of the sound barrier layer and the base portion to prevent distortion of the dash mat when the boot is flexed.

7. An acoustical barrier according to claim 6 wherein the thickness of the cap portion is greater than the thickness of the convolute portion.

8. An acoustical barrier according to claim 1 wherein the thickness of the convolute portion is less than the thickness of the sound barrier layer to prevent distortion of the sound barrier layer when the boot is flexed.

9. An acoustical barrier according to claim 8 wherein the thickness of the cap portion is greater than the thickness of the convolute portion.

10. An acoustical barrier according to claim 1 wherein a central axis of the sound barrier layer opening is collinear with a central axis of the cap portion opening.

11. An acoustical barrier according to claim 10 wherein the cap portion further comprises a collar surrounding the cap portion opening.

12. An acoustical barrier mounted to a fire wall of a motor vehicle, the fire wall separating an engine compartment from a passenger compartment, an opening in the fire wall for receiving a steering column, the acoustical barrier comprising:

a sound barrier layer of a molded construction and sound dampening characteristics, the sound barrier layer having an inner surface that face the fire wall and an outer surface that faces away from the fire wall, an opening extending through the sound barrier layer between the inner and outer surfaces thereof and in alignment with the opening in the fire wall for receiving the steering column;

a boot integrally molded with the sound barrier layer, the boot having a convolute portion and a cap portion integrally molded with the convolute portion; the convolute portion comprising a continuous outer wall section surrounding the sound barrier layer opening, the continuous outer wall section having an upper end integrally formed with a flexible bight portion, a continuous inner wall having an upper end integrally formed with the bight portion and a lower end integrally formed with the cap portion; the cap portion having an opening in alignment with the opening in the sound barrier layer, the cap portion opening being sized to acoustically seal around the steering column for inhibiting the transfer of noise from the engine compartment to the passenger compartment between the steering column and the sound barrier layer.

13. An acoustical barrier according to claim 12 wherein the boot further comprises a base having a continuous lower wall section that surrounds the opening in the sound barrier layer, the continuous lower wall section being integrally formed between the sound barrier layer and a lower end of the continuous outer wall section, the continuous lower wall section projecting upwardly and inwardly from the outer surface of the sound barrier layer toward a central axis of the sound barrier layer opening.

14. An acoustical barrier according to claim 13 wherein the continuous inner wall extends in the same general direction as the outer wall section to form an inner channel therebetween that faces the barrier wall, the width of the inner channel being less than a cross dimension of the steering column shaft to thereby prevent entry of the shaft into the inner channel and thus damage to the boot during installation of the steering column.

15. An acoustical barrier according to claim 14 wherein the cap portion comprises a lower cap segment integrally formed with the lower end of the inner wall, and an upper cap segment extending between the lower cap segment and the cap opening.

16. An acoustical barrier according to claim 15 wherein each of the upper and lower cap segments extends at an acute angle with respect to the central axis of the cap opening, the angle of the lower cap segment being greater than the angle of the upper cap segment to thereby guide the steering column shaft toward the cap opening during installation of the steering column.

17. An acoustical barrier according to claim 16 wherein the convolute portion has a thickness that is less than the thickness of the sound barrier layer to prevent distortion of the sound barrier layer during installation of the steering column.

18. An acoustical barrier according to claim 17 wherein the thickness of the cap portion and base is greater than the thickness of the convolute portion.

19. An acoustical barrier according to claim 12 wherein the thickness of the convolute portion is less than the thickness of the sound barrier layer to prevent distortion of the sound barrier layer during installation of the steering column.

20. An acoustical barrier according to claim 19 wherein the thickness of the cap portion is greater than the thickness of the convolute portion.

* * * * *